United States Patent

Mittelhäuser et al.

Patent Number: 5,099,362
Date of Patent: Mar. 24, 1992

[54] EXTERNAL REARVIEW MIRROR FOR MOTOR VEHICLES

[75] Inventors: Bernhard Mittelhäuser, Am Krähenberg, 3002 Wedemark 2; Jan Schubert, Wedemark, both of Fed. Rep. of Germany

[73] Assignee: Bernhard Mittelhäuser, Wedemark, Fed. Rep. of Germany

[21] Appl. No.: 568,264

[22] Filed: Aug. 15, 1990

[30] Foreign Application Priority Data

Aug. 16, 1989 [DE] Fed. Rep. of Germany ....... 3926891

[51] Int. Cl.⁵ .......................... G02B 5/08; B60R 1/06
[52] U.S. Cl. .................... 359/841; 359/877; 248/479; 248/900
[58] Field of Search ............. 350/604, 632, 634, 636, 350/637; 248/479, 480, 485, 549, 900, 484

[56] References Cited

U.S. PATENT DOCUMENTS

| 4,740,066 | 4/1988 | Whitehead | 350/604 |
| 4,840,475 | 6/1989 | Herzog et al. | 350/604 |
| 4,969,727 | 11/1990 | Harloff et al. | 350/604 |

FOREIGN PATENT DOCUMENTS

| 2826938 | 1/1980 | Fed. Rep. of Germany | 350/604 |
| 3627783 | 9/1987 | Fed. Rep. of Germany | 350/632 |
| 0092131 | 5/1985 | Japan | 350/604 |
| 0092132 | 5/1985 | Japan | 350/604 |
| 0001551 | 1/1986 | Japan | 350/632 |
| 0001653 | 1/1987 | Japan | 350/637 |

*Primary Examiner*—Bruce Y. Arnold
*Assistant Examiner*—R. D. Shafer
*Attorney, Agent, or Firm*—Robert W. Becker & Associates

[57] ABSTRACT

An external rearview mirror for a motor vehicle is provided. The mirror can be pivoted by a swivel arm counter to the direction of travel. To improve the pivot movement and provide a smooth transition to a stationary part of the mirror, the swivel arm is guided in the vicinity of that end thereof that is proximate to the pivot location, via a guide rod or a curved guide, so that during pivoting, the mirror housing also moves away in the vicinity of that edge thereof that is proximate to the pivot location.

11 Claims, 3 Drawing Sheets

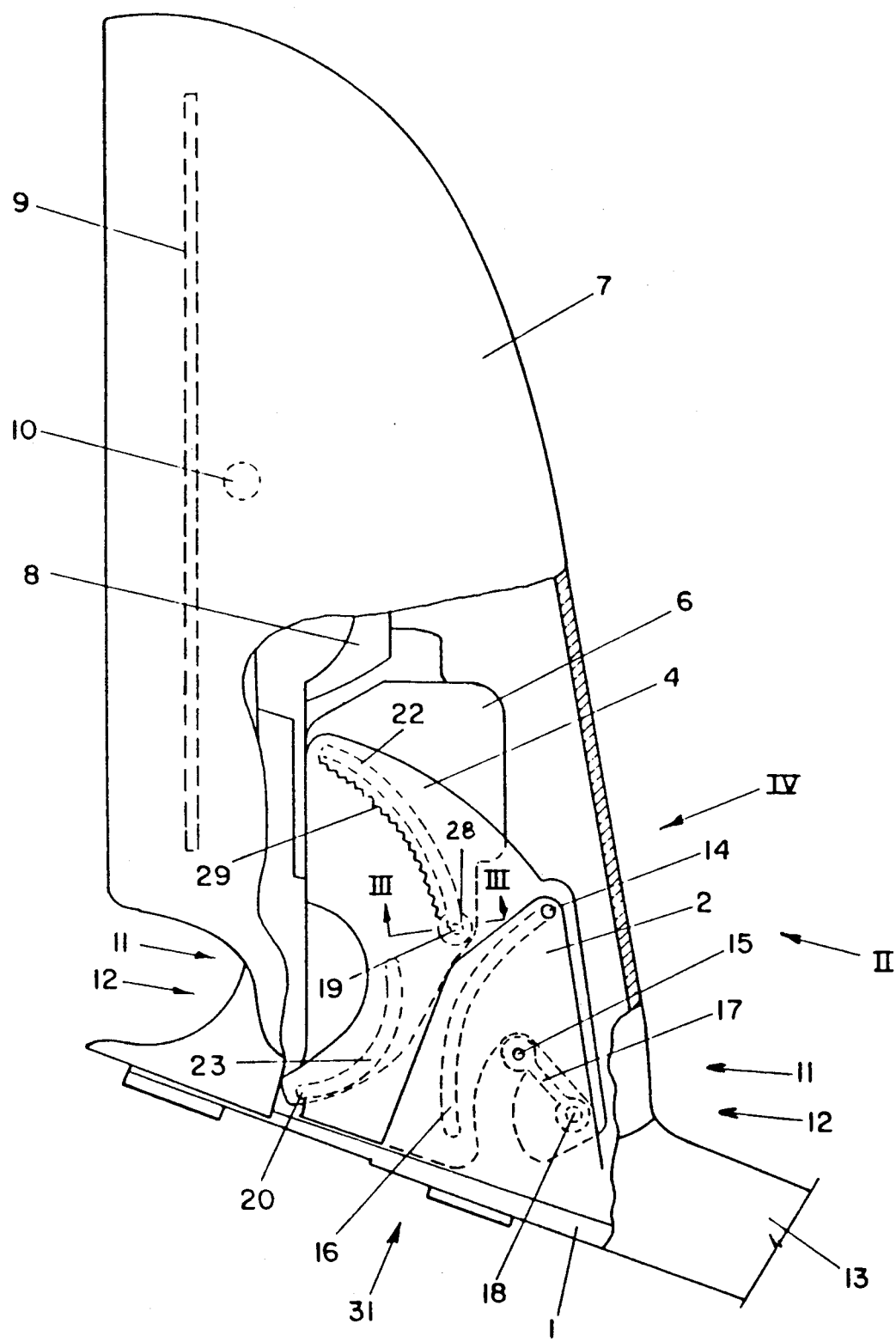
FIG—1

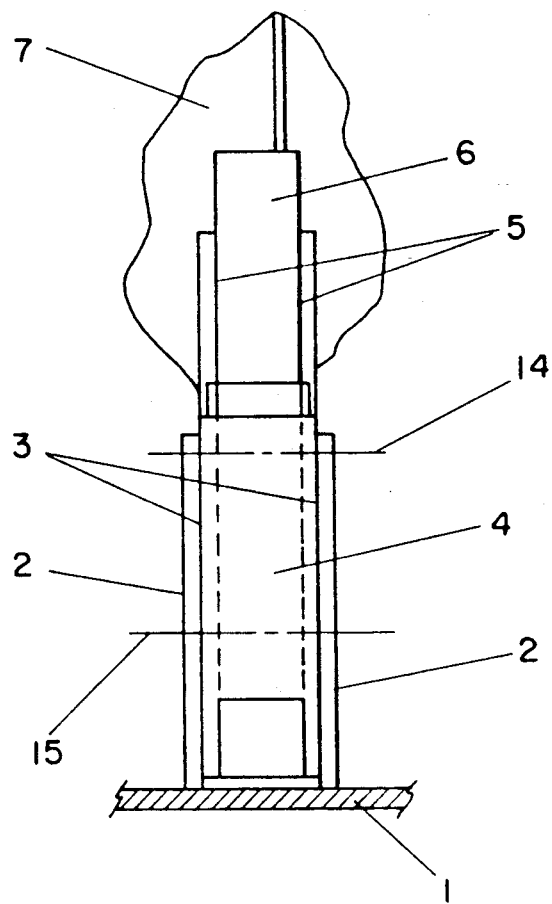
FIG—2
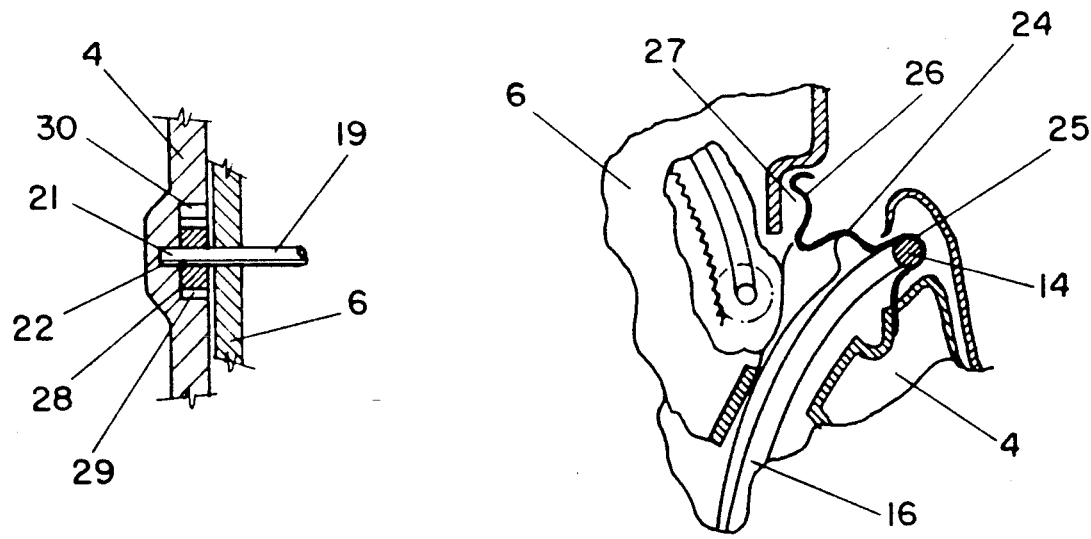
FIG—3
FIG—4

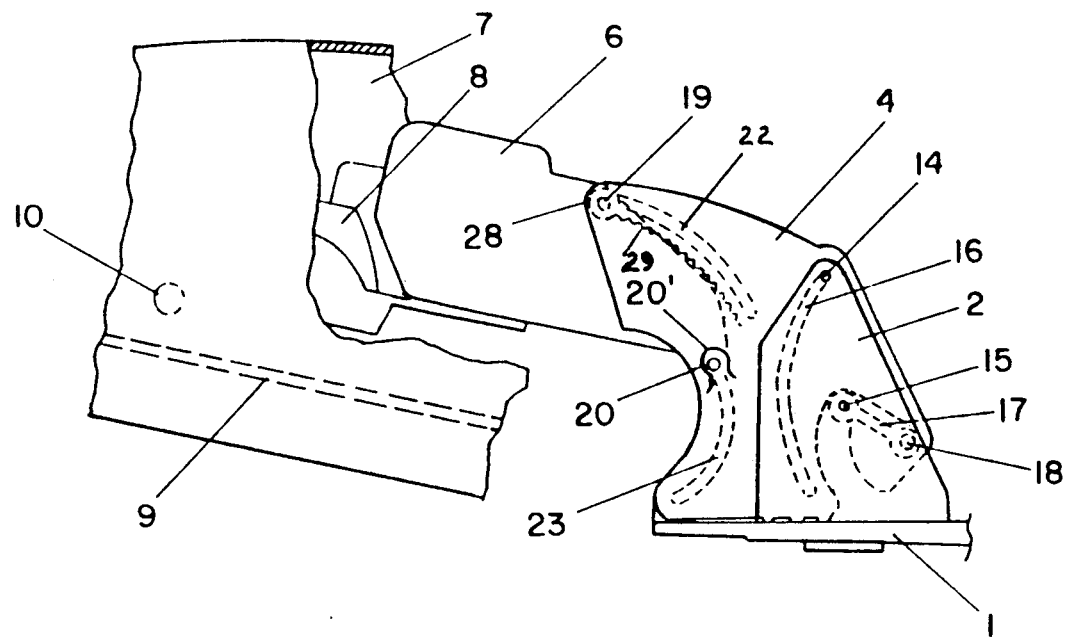
FIG—5
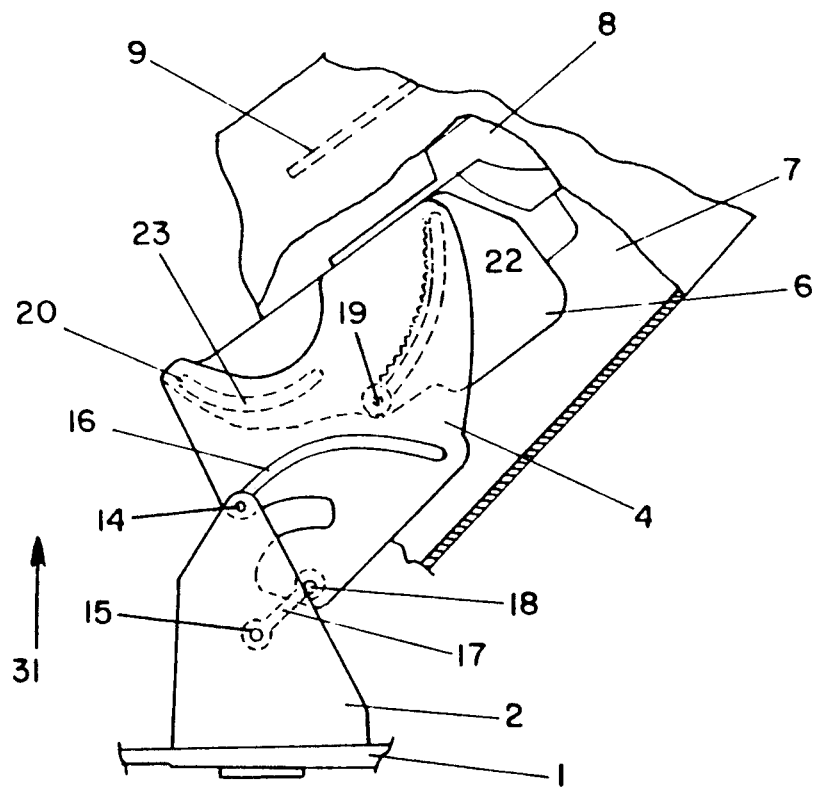
FIG—6

EXTERNAL REARVIEW MIRROR FOR MOTOR VEHICLES

BACKGROUND OF THE INVENTION

The present invention relates to an external rearview or side view mirror for a motor vehicle, and includes a mirror housing that is open on one side to receive a mirror pane, and also includes a bracket or mounting that is secured on a side wall of the vehicle, with the mirror housing being connected to the mounting via a swivel arm that is pivotably mounted to the mounting as well as to the mirror housing about essentially vertically extending spindles that are disposed one behind the other when viewed in the longitudinal direction of the vehicle, so that the mirror housing, which is held by releasable arresting means can be released from the front or rear pivot location, as viewed in the direction of forward travel of the vehicle, and can be pivoted toward the vehicle side wall in or counter to the direction of forward travel.

Due to air resistance and optics, the mirror housing must merge with the covered mounting in a smooth and directly connected manner. As a result of this requirement, it becomes difficult to effect pivoting movements of the mirror housing.

It is therefore an object of the present invention to provide a mirror that can be pivoted toward the front and toward the rear in a direction toward the side wall of the vehicle, and that in this connection can have edges on the mirror housing and on the mounting that merge with one another in a smooth manner with practically no gaps therebetween, whereby the covering for the mounting and the mirror housing itself have an advantageous streamlined configuration.

BRIEF DESCRIPTION OF THE DRAWINGS

This object, and other objects and advantages of the present invention, will appear more clearly from the following specification in conjunction with the accompanying schematic drawings, in which:

FIG. 1 is a partially broken away and cross-sectioned plan view of one exemplary embodiment of the inventive external rearview mirror in its normal position; and FIG. 2 is a partial view of the mirror of FIG. 1 taken in the direction of the arrow II thereof, with tho outer covering of the mirror housing having been left off;

FIG. 3 is a partial cross-sectional view taken along the line III—III in FIG. 1;

FIG. 4 is a partial horizontal cross-sectional view of that portion of FIG. 1 that is indicated by the arrow IV;

FIG. 5 is a partially broken away and cross-sectioned view of the mirror 1 in the so-called park position; and FIG. 6 is a partially broken away and cross-sectioned view of the mirror of FIG. 1 in the forwardly pivoted position.

SUMMARY OF THE INVENTION

The external rearview mirror of the present invention is characterized primarily in that the pivot locations on the swivel arm are provided with a curved guide means or a guide rod in such a way that during pivoting of the mirror housing relative to the swivel arm, and a pivoting of the swivel arm relative to the mounting, the mirror housing also moves away from the mounting in the vicinity of the pivot locations.

Consequently, during pivoting in one or the other direction, the mirror housing experiences over practically its entire width first of all a lifting movement in order to be able to continue the pivoting. In this way, it is possible to embody the covering or the outside of the mirror housing in a manner independent of the requirement that the mirror housing be able to pivot. It is possible to have a transition between the parts of the mirror that is smooth with practically no gaps therebetween.

Such an arrangement requires a particularly good reciprocal guidance of the elements that take part in the pivoting movement (the mirror housing, the swivel arm, and the mounting). In order to achieve this, two side pieces that are disposed parallel to one another are disposed on the mounting; the swivel arm is movable, with slight play, between these side pieces and in turn, again with little play, accommodates a projection of the mirror housing. This projection can be embodied in such a way that it can accommodate an electric motor, in order in this way to be able to pivot the mirror housing via a gear wheel and teeth arranged along a curve on the swivel arm. This type of drive mechanism is advantageous if the mirror housing is to be pivoted toward the rear into a park position, and this pivoting is to be realized in an electro-mechanical manner.

Further specific features of the present invention will be described in detail subsequently.

DESCRIPTION OF PREFERRED EMBODIMENTS

Referring now to the drawings in detail, secured on a vehicle side wall that extends in the longitudinal direction of the vehicle is a bracket or mounting 1 that serves for the mounting of the mirror 9. Secured to the mounting 1 are two side pieces 2 having essentially horizontal inner surfaces 3 that extend parallel to one another. The side pieces 2 with their inner surfaces 3 serve to pivotably mount the front end (as viewed in the longitudinal direction of the vehicle) of a swivel arm 4 that in turn, between similarly essentially horizontal surfaces 5, shiftably accommodates, with little play, the lower end of an essentially box-shaped projection 6 of the mirror housing 7. The components 6, 4, and 2 are thus so to speak telescoped within one another, and are also telescopically shiftable and pivotable relative to one another.

The outside of the projection 6 is fixedly connected to the mirror-receiving means 8, which serves for the pivotable mounting of the mirror pane 9 via a ball-and-socket joint 10, and also serves for the securement of the outer covering of the mirror housing 7.

The inward edge 11 of the mirror housing 7 abuts the outward edge 12 of the covering 13 of the mounting 1. In other words, a practically jointless transition is provided.

The two side pieces 2 are provided with two rigid, fixedly mounted, essentially vertical spindles 14, 15 t hat are disposed one above the other. The outer spindle 14 extends through the swivel arm 4 via a slot 16 that has the shape of an arc, while the lower spindle 15 serves for pivotably mounting a guide rod 17, which in the normal position of the mirror illustrated in FIG. 1 is directed at an angle toward the rear and is pivotably connected with the front end of the swivel arm 4, as viewed in the longitudinal direction of the vehicle (again with an essentially perpendicular pivot axis). This pivot joint (between the guide rod 17 and the swivel arm 4) is designated by the reference numeral 18.

The pivotable connection between the swivel arm 4 and the projection 6 is effected by two spindles 19, 20 that are mounted on the projection 6 and extend parallel to the spindles 14, 15. The stump ends 21 of the spindles 19, 20 project laterally out of the projection 6 and engage, with little play, in arc-shaped slots 22, 23 on the inner side of the swivel arm 4. The most outwardly disposed spindle 19, as viewed from the vehicle, is at the same time a drive spindle, the function of which will be described in detail subsequently.

Not only the slots 16 but also the slots 22, 23 have a circular configuration and are of a limited length, so that the guidance can be effected only over the length of the arc, i.e. is limited.

In order to secure and releasably hold the components 6, 4, and 2 in the normal position illustrated in FIG. 1, a releasable arresting device in the form of a flat retaining spring 24, having two releasable arresting means 25, 26 in the form of an expandable catch 25 and an overlap portion 26, is mounted on the swivel arm 4. The retaining spring 24 is held in place on the spindle 14 via an expandable catch 25, while an overlap portion 26 of the spring that can bend away engages a cam 27 of the projection 6 from behind. In this way, all of the components are held together via a retaining spring 24 on the swivel arm 4; however, these components can be released from one another by overcoming the spring-retaining forces.

Disposed within the box-shaped projection 6 is an electric motor 190 that can be switched on from the interior of the vehicle. The drive shaft of the electric motor is the spindle 19 which, as can be seen most clearly in FIG. 3, carries on the outside, ahead of the stump end 21, a gear wheel 28 that cooperates with teeth 29 that follow a circular course in conformity with the slot 22. The teeth 29 delimit one side of a widened portion 30 of the slot 22, with the gear wheel 28 being disposed in this widened portion.

In the event of an impact, the mirror housing 7 is pivoted toward the front as shown in FIG. 6. The important thing is that this pivoting movement is essentially determined by the spindle 14 and the slot 16, although as a consequence of the guide rod 17, at the start of the pivoting movement first a raising movement in the direction of the arrow 31 results; the pivot joint 18 withdraws from the side piece 2, so that the edges 11, 12 can lift free of one another. Only after the movement of the guide rod 17 ensures a release of these edges, is the actual pivot movement of the swivel arm 4 relative to the side piece 2 completed. The end position is shown in FIG. 6. When the swivel arm 4 along with the mirror housing 7 are pivoted back, there results via the guide rod 17 and the slot 16, when the pivot movement has been completed, a superimposed movement that is directed practically perpendicular relative to the base surface of the mounting 1.

If the mirror housing 7 is to be moved into the park position illustrated in FIG. 5, the motor that is disposed in the projection 6 is switched on; the gear wheel 28 then first pulls the cam 27 free from the overlap portion 26 of the retaining spring 24, so that now the two spindles 19, 20, in conformity with the course of the two slots 22, 23, can move to the outer ends of these slots, whereby also initially a lifting movement occurs that is directed approximately perpendicular to the base surface of the mounting 1, and then the actual pivoting occurs. In the end position shown in FIG. 5, in order to ensure the park position, the spindle 20 engages a spring catch (arresting means) 20' that is embodied as an approximately U-shaped clamp. This pivoting movement is effected solely by having the gear wheel 28 roll along the teeth 29; in this connection, the motor is switched off in the end position by means of a limit switch or the like. To return the mirror housing 7 to the position illustrated in FIG. 1, the electric motor is again switched on in order to reverse the movement of the stump ends 21 in the slots 22, 23. Toward the end of this superimposed movement, a normal movement, i.e. a displacement that is approximately perpendicular to the mounting 1, again results.

Consequently, a swiveling movement results during the pivoting movement of the mirror body or housing 7 either toward the front or toward the rear. However, the pivoting movement is not effected with a fixed pivot axis; instead, a guide rod 17 and a curved guide means (components 20, 23) are used such that in the vicinity of the critical edges 11, 12 an approximately perpendicular lifting occurs.

It should be noted that the pinion drive, with the aide of the teeth 29 and the gear wheel 28, also exerts a dampening effect, and in particular due to the increased contact surface area resulting from the teeth, and also due to the accompanying components of the electric drive mechanism.

As a consequence of the aforementioned pivot connection using the components 20, 23 and the guide rod 17, the pivot axis is artificially displaced from a gearing or drive standpoint in that the pivot radius is considerably increased.

The present invention is, of course, in no way restricted to the specific disclosure of the specification and drawings, but also encompasses any modifications within the scope of the appended claims.

What we claim is:

1. An external rearview mirror for a motor vehicle, including a mirror housing that is open on one side to receive a mirror plane, and also including a mounting that is secured on a side wall of said vehicle, with said mirror housing being connected to said mounting via a swivel arm that is pivotably mounted to said mounting as well as to said mirror housing about essentially vertically extending spindles that are disposed one behind the other when viewed in the longitudinal direction of said vehicle, so that said mirror housing, which is held by a releasable arresting device, can be released from the front or rear pivot location, as viewed in the direction of forward travel of said vehicle, and can be pivoted toward said side wall of said vehicle in and counter to said direction of forward travel, respectively, the improvement wherein:

said swivel arm is pivotably connected to said mounting and said mirror housing via a guide rod and a first curved guide means, respectively, in such a way that, upon pivoting said mirror housing relative to said swivel arm and pivoting said swivel arm relative to said mounting, respectively, said mirror housing first moves away from said mounting in the vicinity of a pivot location of said mirror housing before pivoting toward said wall of said vehicle in and counter to said direction of forward travel, respectively;

said mounting is provided with two side pieces between which is guided and held said swivel arm, and in which said mirror housing is provided with a projection that extends into said swivel arm, where it is guided and pivotably mounted;

said side pieces, said projection, and said swivel arm fit together in a telescopic manner; and said swivel arm is mounted on said side pieces via first and second spindles that are disposed essentially one beyond the other in a direction proceeding from said side wall of said vehicle, whereby said first and outermost one of said spindles extends through said first curved guide means of said swivel arm, and said second spindle serves as a connection for said guide rod, which is also connected to said swivel arm.

2. A mirror according to claim 1, wherein said first and second spindles are fixedly mounted on said side pieces.

3. A mirror according to claim 1, wherein in a normal position of said mirror body, said guide rod forms a small angle with respect to the base surface of said mounting.

4. A mirror according to claim 1, wherein said projection of said mirror housing is provided with two laterally projecting spindles that are disposed essentially one beyond the other in a direction proceeding from said side wall of said vehicle, with said laterally projecting spindles extending into second and third curved guide means of said swivel arm, respectively.

5. A mirror according to claim 4, wherein said projection accommodates an electric motor that drives a gear wheel disposed on a stump end of one of said laterally projecting spindles that extends into said third guide means that is provided with teeth that mesh with said gear wheel in such a way that rotation of said gear wheel effects a pivoting of said projection relative to said swivel arm.

6. A mirror according to claim 5, wherein, in a pivoted state, one of said laterally projecting spindles that extends into said second guide means releasably engages an arresting means.

7. A mirror according to claim 5, wherein said second and third curved guide means have a length that is adequate to attain a park position of said mirror housing.

8. A mirror according to claim 1, wherein said swivel arm is provided with said releasable arresting device in the form of a retaining spring that forms two releasable arresting means to connect said swivel arm to said side pieces and said projection.

9. A mirror according to claim 8, wherein said arresting means of said retaining spring comprises an expandable catch to said engage said first spindle mounted on said side pieces, and a bendable overlap portion to engage a cam of said projection.

10. A mirror according to claim 7, wherein, to guide said projection, said second and said third curved guide means are superimposed and curved in the same direction.

11. A mirror according to claim 4, wherein said first, second and third curved guide means are slots having a limited length.

* * * * *